(12) United States Patent
Smith et al.

(10) Patent No.: US 9,230,081 B2
(45) Date of Patent: Jan. 5, 2016

(54) USER AUTHORIZATION AND PRESENCE DETECTION IN ISOLATION FROM INTERFERENCE FROM AND CONTROL BY HOST CENTRAL PROCESSING UNIT AND OPERATING SYSTEM

(71) Applicant: Intel Corporation, Santa Clara, CA (US)

(72) Inventors: Ned M. Smith, Beaverton, OR (US); Victoria C. Moore, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 176 days.

(21) Appl. No.: 13/785,883

(22) Filed: Mar. 5, 2013

(65) Prior Publication Data

US 2014/0259125 A1    Sep. 11, 2014

(51) Int. Cl.
| | | |
|---|---|---|
| G06F 21/30 | (2013.01) | |
| G06F 21/32 | (2013.01) | |
| G06F 21/57 | (2013.01) | |

(52) U.S. Cl.
CPC ............... *G06F 21/32* (2013.01); *G06F 21/57* (2013.01)

(58) Field of Classification Search
CPC .................................. G06F 21/32; G06F 21/57
USPC ........................................................ 726/4, 5
See application file for complete search history.

(56) References Cited

U.S. PATENT DOCUMENTS

| | | | |
|---|---|---|---|
| 4,649,233 A | 3/1987 | Bass et al. | |
| 5,371,871 A | 12/1994 | Spilo | |
| 5,426,775 A | 6/1995 | Boccon-Gibod | |
| 5,809,230 A | 9/1998 | Pereira | |
| 5,943,423 A | 8/1999 | Muftic | |
| 6,009,540 A | 12/1999 | Craft et al. | |
| 6,195,749 B1 | 2/2001 | Gulick | |
| 6,715,073 B1 | 3/2004 | An et al. | |
| 7,103,529 B2 | 9/2006 | Zimmer | |

(Continued)

FOREIGN PATENT DOCUMENTS

| | | |
|---|---|---|
| JP | 2005-332240 A | 12/2005 |
| WO | 2013/048434 A1 | 4/2013 |

OTHER PUBLICATIONS

International Search Report and Written Opinion received for PCT Patent Application No. PCT/US2014/019461, mailed on Apr. 29, 2014, 10 pages.

(Continued)

*Primary Examiner* — Saleh Najjar
*Assistant Examiner* — Peiliang Pan
(74) *Attorney, Agent, or Firm* — Trop, Pruner & Hu, P.C.

(57) ABSTRACT

An embodiment may include circuitry to be included, at least in part, in a host. The host may include at least one host central processing unit (CPU) to execute, at least in part, at least one host operating system (OS). The circuitry may perform, at least in part, at least one operation in isolation both from interference from and control by the at least one host CPU and the at least one host OS. The at least one operation may include user authorization determination and user presence determination. The authorization determination may be in response, at least in part, to indication of physical presence of at least one user in proximity to the host. The user presence determination may determine, at least in part, whether, after the indication has been provided, the physical presence of the at least one user in the proximity to the host has ceased.

16 Claims, 5 Drawing Sheets

(56) References Cited

U.S. PATENT DOCUMENTS

| | | | |
|---|---|---|---|
| 7,127,579 | B2 | 10/2006 | Zimmer et al. |
| 7,210,034 | B2 | 4/2007 | Smith |
| 7,216,369 | B2 | 5/2007 | Wiseman et al. |
| 7,552,419 | B2 | 6/2009 | Zimmer et al. |
| 7,590,867 | B2 | 9/2009 | Scarlata et al. |
| 7,636,442 | B2 | 12/2009 | Scarlata et al. |
| 7,827,371 | B2 | 11/2010 | Yao et al. |
| 8,060,876 | B2 | 11/2011 | Smith et al. |
| 8,108,668 | B2* | 1/2012 | Rozas .......................... 713/155 |
| 8,327,415 | B2 | 12/2012 | Yao et al. |
| 2001/0005887 | A1 | 6/2001 | Boroditsky et al. |
| 2001/0037379 | A1 | 11/2001 | Livnat |
| 2002/0124176 | A1 | 9/2002 | Epstein |
| 2002/0184491 | A1 | 12/2002 | Morgan et al. |
| 2002/0194496 | A1 | 12/2002 | Griffin et al. |
| 2003/0023812 | A1 | 1/2003 | Nalawadi et al. |
| 2005/0021968 | A1 | 1/2005 | Zimmer et al. |
| 2005/0060568 | A1 | 3/2005 | Beresnevichiene et al. |
| 2005/0063544 | A1 | 3/2005 | Uusitalo et al. |
| 2005/0105734 | A1* | 5/2005 | Buer et al. ..................... 380/270 |
| 2005/0144609 | A1 | 6/2005 | Rothman et al. |
| 2005/0210467 | A1 | 9/2005 | Zimmer et al. |
| 2005/0246552 | A1 | 11/2005 | Bade et al. |
| 2006/0015358 | A1 | 1/2006 | Chua |
| 2006/0020781 | A1 | 1/2006 | Scarlata et al. |
| 2006/0224878 | A1 | 10/2006 | Datta et al. |
| 2006/0230439 | A1 | 10/2006 | Smith et al. |
| 2006/0242280 | A1 | 10/2006 | Zimmer et al. |
| 2006/0288202 | A1 | 12/2006 | Doran et al. |
| 2007/0016766 | A1 | 1/2007 | Richmond et al. |
| 2007/0055856 | A1 | 3/2007 | Zimmer et al. |
| 2007/0106986 | A1 | 5/2007 | Worley |
| 2007/0226786 | A1 | 9/2007 | Berger et al. |
| 2007/0255948 | A1 | 11/2007 | Ali et al. |
| 2007/0300069 | A1 | 12/2007 | Rozas |
| 2008/0022108 | A1 | 1/2008 | Brannock et al. |
| 2008/0120499 | A1 | 5/2008 | Zimmer et al. |
| 2008/0126779 | A1* | 5/2008 | Smith ............................... 713/2 |
| 2008/0155277 | A1 | 6/2008 | Bulusu et al. |
| 2008/0178176 | A1 | 7/2008 | Berger et al. |
| 2008/0208580 | A1 | 8/2008 | Scholl |
| 2008/0244569 | A1 | 10/2008 | Challener et al. |
| 2009/0063799 | A1 | 3/2009 | Berenbaum et al. |
| 2009/0067685 | A1 | 3/2009 | Boshra et al. |
| 2009/0172381 | A1 | 7/2009 | Zimmer et al. |
| 2009/0259848 | A1 | 10/2009 | Williams et al. |
| 2009/0319806 | A1 | 12/2009 | Smith et al. |
| 2010/0023782 | A1 | 1/2010 | Prakash et al. |
| 2013/0298208 | A1* | 11/2013 | Ayed ................................. 726/6 |

OTHER PUBLICATIONS

NFC Tags Explained, retrived from http//kimtag.com/s/nfc_tags, Jan. 25, 2013, pp. 1-4.
TPM Main Part 1 Design Principles, Specification version 1.2 Level 2 Revision 116, TCG Published, Mar. 1, 2011, 184 Pages.
TPM Main Part 2 TPM Structures, Specification version 1.2 Level 2 Revision 116, TCG Published, Mar. 1, 2011, 202 Pages.
TPM Main Part 3 Commands, Specification version 1.2 Level 2 Revision 116, TCG Published, Mar. 1, 2011, 339 Pages.
Sirbu, et al., "Distributed Authentication in Kerberos Using Public Key Cryptography", In: Symposium on Network and Distributed System Security, San Diego, California: IEEE Computer Society Press, 1997, 8 pages.
Smith, Ned, "Identity Protection Technology", PC client Group, Massachusetts Institute of Technology, Kerberos Conference, Oct. 25-26, 2011, 22 Pages.
Wikipedia, the free encyclopedia, "Hardware security module", retrived from http://en.wikipedia.org/wiki/Hardware_security_module, Jan. 25, 2013, pp. 1-6.
Final Office Action received for U.S. Appl. No. 10/225,048 mailed on Aug. 3, 2006, 11 pages.
Non-Final Office Action received for U.S. Appl. No. 10/225,048 mailed on Feb. 24, 2006, 9 pages.
Notice of Allowance received for U.S. Appl. No. 10/225,048 mailed on Jan. 11, 2007, 8 pages.
Response to Final Office Action received for U.S. Appl. No. 10/225,048, filed Oct. 31, 2006, 8 pages.
Response to Non-Final Office Action received for U.S. Appl. No. 10/225,048, filed May 24, 2006, 10 pages.
Final Office Action received for U.S. Appl. No. 10/808,973 mailed on Mar. 17, 2008, 12 pages.
Non-Final Office Action received for U.S. Appl. No. 10/808,973 mailed on Aug. 25, 2008, 13 pages.
Non-Final Office Action received for U.S. Appl. No. 10/808,973 mailed on Sep. 13, 2007, 10 pages.
Notice of Allowance received for U.S. Appl. No. 10/808,973 mailed on Apr. 3, 2009, 12 pages.
Response to Non-Final Office Action received for U.S. Appl. No. 10/808,973, filed Dec. 13, 2007, 12 pages.
Response to Restriction Requirement received for U.S. Appl. No. 10/808,973, filed Aug. 10, 2007, 11 pages.
Restriction Requirement received for U.S. Appl. No. 10/808,973 mailed on May 10, 2007, 5 pages.
Notice of Allowance received for U.S. Appl. No. 11/894,915 mailed on Jun. 3, 2011, 11 pages.
Final Office Action received for U.S. Appl. No. 12/165,639 mailed Mar. 13, 2012, 17 pages.
Non-Final Office Action received for U.S. Appl. No. 12/165,639 mailed on Mar. 22, 2011, 39 pages.
Response to Final Office Action received for U.S. Appl. No. 12/165,639, filed Aug. 13, 2012, 22 pages.
Response to Non-Final Office Action received for U.S. Appl. No. 12/165,639, filed Sep. 22, 2011, 45 pages.
Response to Non-Final Office Action received for U.S. Appl. No. 12/165,639, filed Dec. 12, 2011, 42 pages.
Non-Final Office Action received for U.S. Appl. No. 12/214,830 mailed on Apr. 4, 2011, 11 pages.
Non-Final Office Action received for U.S. Appl. No. 12/214,830 mailed on Sep. 8, 2011, 10 pages.
Notice of Allowance received for U.S. Appl. No. 12/214,830, mailed on Feb. 16, 2012, 6 pages.
Response to Non-Final Office Action received for U.S. Appl. No. 12/214,830, filed Jun. 27, 2011, 6 pages.
Response to Non-Final Office Action received for U.S. Appl. No. 12/214,830, filed Dec. 7, 2011, 6 pages.
Non-Final Office Action received for U.S. Appl. No. 12/468,532 mailed on Dec. 3, 2010, 11 pages.
Notice of Allowance received for U.S. Appl. No. 12/468,532 mailed on Mar. 31, 2011, 13 pages.
Response to Non-Final Office Action received for U.S. Appl. No. 12/468,532, filed Mar. 3, 2011, 11 pages.
Notice of Allowance received for U.S. Appl. No. 13/222,382 mailed on May 9, 2012, 9 pages.
International Search Report received for Patent Application No. PCT/US2011/054176, mailed on Mar. 19, 2012, 3 Pages.
International Search Report and Written Opinion received for Patent Application No. PCT/US2011/067573, mailed on Sep. 28, 2012, 2 pages.
Notice of Allowance mailed Apr. 3, 2009 in U.S. Appl. No. 10/808,973, 11 pages.
Dirk Balfanz, "FIDO U2F Raw Message Formats", FIDO Alliance Proposed Standard, May 14, 2015, pp. 1-10, FIDO Alliance.
Rolf Lindemann, "FIDO Security Reference", FIDO Alliance Proposed Standard, May 14, 2015, pp. 1-30, FIDO Alliance.
Dirk Balfanz, "FIDO U2F Implementation Considerations", FIDO Alliance Proposed Standard, May 14, 2015, pp. 1-5, FIDO Alliance.
Dirk Balfanz, FIDO U2F Javascript API, FIDO Alliance Proposed Standard, May 14, 2015, pp. 1-7, FIDO Alliance.
Alexei Czeskis, "FIDO NFC Protocol Specification v1.0", FIDO Alliance Proposed Standard, May 14, 2015, pp. 1-5, FIDO Alliance.
Sampath Srinivas, "Universal 2nd Factor (U2F) Overview", FIDO Alliance Proposed Standard, May 14, 2015, pp. 1-5, FIDO Alliance.
Salah Machani, et al., "FIDO UAF Review Draft Spec Set", FIDO Alliance Proposed Standard, Dec. 8, 2014, pp. 1-202.

* cited by examiner

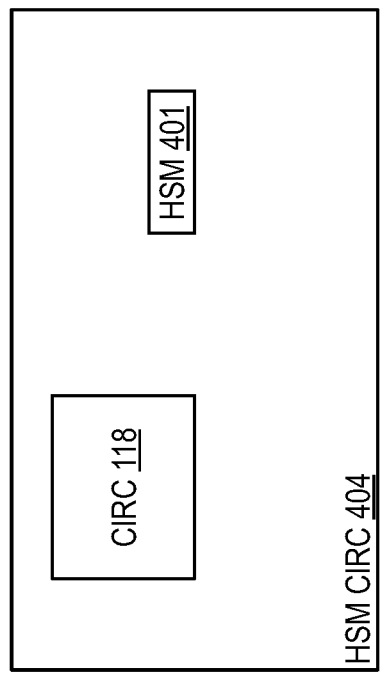

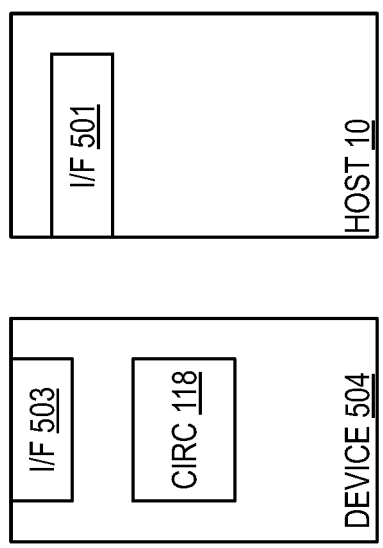

USER AUTHORIZATION AND PRESENCE DETECTION IN ISOLATION FROM INTERFERENCE FROM AND CONTROL BY HOST CENTRAL PROCESSING UNIT AND OPERATING SYSTEM

TECHNICAL FIELD

Embodiments disclosed herein generally relate to user authorization and presence detection in isolation from interference from and control by a host central processing unit (CPU) and host operating system (OS).

BACKGROUND

In one convention system, a host CPU in a host executes a host OS. The OS performs (alone and/or in combination with other software executed by the CPU) security features. These features are intended (ideally) to prevent an unauthorized user (or malicious software attempting to pose as an authorized user) from issuing unauthorized commands to or otherwise compromising the host. In actual implementation, however, such software-based security features suffer from significant disadvantages and drawbacks that may prevent the software from achieving these ideally intended results.

For example, such software-based security features are incapable of ensuring that it is an actual user (and not, for example, malicious software posing, either locally or remotely via a network, as a user) that is seeking access to the host. Additionally, such software-based security features tend to be relatively easily infiltrated, corrupted, and/or circumvented by malicious software (e.g., as compared to security features that are implemented predominately or entirely in hardware or firmware).

One proposed solution involves including trusted platform module (TPM) security hardware in the host. Such TPM hardware may comply with TPM Main Specification (including Part 1 Design Principles, Part 2 TPM Structures, and Part 3 Commands), Version 1.2, Revision 116, published 1 Mar. 2011, by Trusted Computing Group, Inc. The TPM hardware is exposed to a trusted hardware attestation key device via a user physical presence general purpose input/output (GPIO) pin of TPM hardware. The pin is set when a user physically presses a certain button of the host. The setting of the pin grants the user (i.e., the person who pressed the button) access to the security functions of the TPM hardware.

Unfortunately, in this conventional arrangement, no separate authentication (e.g., independent of the user merely pressing the button) of the user is involved prior to, and as a condition for, the user being granted access to the security functions of the TPM. Accordingly, if an unauthorized user obtains physical access to the host and presses the button, the unauthorized user is granted access to the security functions of the TPM hardware.

Also, in this conventional arrangement, continuing access to the security functions of the TPM hardware is not conditioned upon an authorized user remaining in proximity to the host. Accordingly, such access may not be revoked even if the user ceases to be in proximity to the host. Unfortunately, this may permit an unauthorized person to gain access to such functions, for example, after the authorized user has left the proximity of the host.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which:

FIG. 4 illustrates elements in an embodiment.
FIG. 5 illustrates elements in an embodiment.

Although the following Detailed Description will proceed with reference being made to illustrative embodiments, many alternatives, modifications, and variations thereof will be apparent to those skilled in the art. Accordingly, it is intended that the claimed subject matter be viewed broadly.

Description of Embodiments

Figure 1:
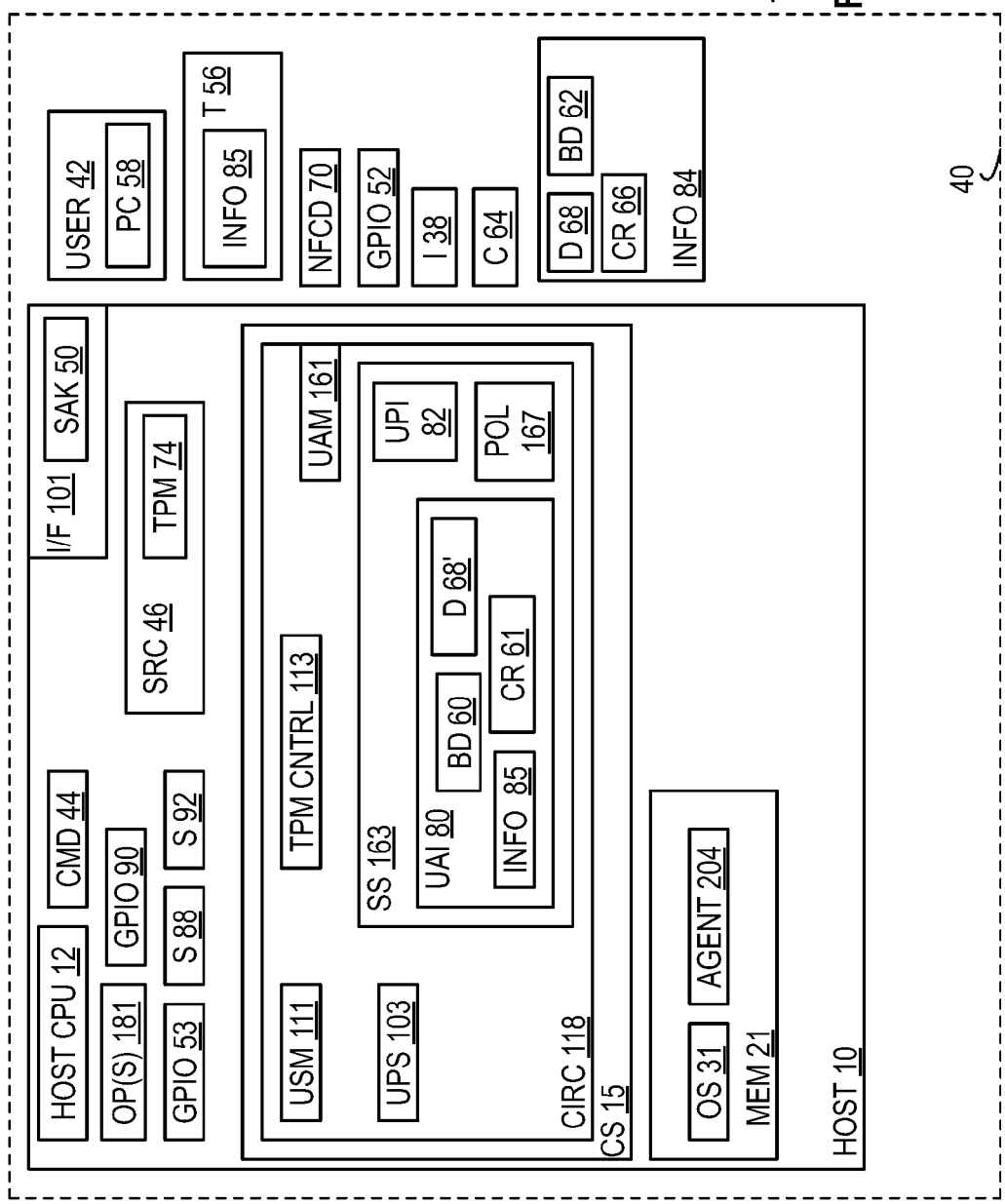
FIG. 1 illustrates elements in an embodiment.

FIG. 1 illustrates a system embodiment 100. System 100 may include one or more hosts 10. In this embodiment, a "computer," "host," "server," "client," "node", and/or "device" may be used interchangeably, and may be or comprise, for example, one or more end stations, smart phones, tablet computers, appliances, communication instrumentalities, intermediate stations, network interfaces, clients, servers, storage, mass storage, and/or components and/or portions thereof. In this embodiment, a "network," "channel", "communication link," and/or "communication lane" may be used interchangeably, and may be or may comprise, for example, one or more virtual, physical, and/or logical mechanisms, instrumentalities, modalities, and/or portions thereof that may permit, facilitate, and/or allow, at least in part, two or more entities to be communicatively coupled together.

In this embodiment, a first entity may be "communicatively coupled" to a second entity if the first entity is capable of transmitting to and/or receiving from the second entity one or more commands and/or data. Also in this embodiment, a "wireless network" may be or comprise a network that permits, at least in part, at least two entities to be wirelessly communicatively coupled, at least in part. In this embodiment, a "wired network" may be or comprise a network that permits, at least in part, at least two entities to be communicatively coupled, at least in part, via non-wireless means, at least in part. In this embodiment, data may be or comprise one or more commands (for example one or more program instructions), and/or one or more such commands may be or comprise data. Also in this embodiment, an instruction may include data and/or one or more commands. Similarly, in this embodiment, data may include one or more instructions and/or one or more commands.

One or more hosts 10 may comprise one or more single and/or multi-core host processor (HP) CPU 12, one or more chipsets (CS) 15, one or more security-related components (SRC) 46, one or more user interfaces (I/F) 101, and/or computer-readable/writable host memory 21. One or more chipsets (which may comprise, e.g., not shown memory and/or input/output controller circuitry) 15 may communicatively couple (and/or be capable of communicatively coupling) one or more host processor CPU 12, I/F 101, memory 21, and/or SRC 46.

For example, in this embodiment, one or more CS 15, CPU 12, SRC 46, I/F 101, and/or memory 21 may be comprised in, at least in part, one or more not shown circuit boards (e.g., one or more system motherboards) that may comprise, at least in part, one or more not shown bus and/or point-to-point interconnect systems/links. In this arrangement, one or more CS 15 may be communicatively coupled (e.g., via one or more of these not shown bus and/or point-to-point interconnect links) to one or more host processor CPU 12, I/F 101, memory 21, and/or SRC 46.

Alternatively or additionally, without departing from this embodiment, although not shown in the Figures, some or all of the components and/or the functionality of one or more of these components (e.g., CS 15, CPU 12, I/F 101, memory 21, and/or SRC 46) may be comprised, at least in part, in one or more other of these components. For example, SRC 46 and/or CPU 12 may be comprised, in whole or in part, in CS 15, or vice versa, without departing from this embodiment. Further additionally or alternatively, without departing from this embodiment, one or more of these components may be comprised, at least in part, in one or more not shown daughter circuit cards that may be capable of being inserted into one or more not shown card slots of one or more not shown motherboards. When so inserted, these one or more daughter cards (and/or their components) may become communicatively coupled to each other and/or to other components in the one or more daughter cards and/or motherboards. Many other variations are possible without departing from this embodiment.

In this embodiment, respective machine-readable program instructions may be stored in computer-readable/writable memory 21, SRC 46, CPU 12, and/or CS 15. In operation of one or more hosts 10, these respective instructions may be respectively accessed and executed by SRC 46, CPU 12, and/or CS 15. When these instructions are so accessed and executed, this may result, at least in part, in these respective components performing the respective operations described herein as being performed by these respective components. For example, in operation of one or more hosts 10, one or more CPU 12 may access and execute instructions that may result in (1) CPU 12 executing, at least in part, one or more host OS 31, and (2) one or more OS becoming resident, at least in part, in memory 21.

In this embodiment, SRC 46 may be or comprise, at least in part, one or more TPM 74. In this embodiment, one or more TPM 74 may comply and/or be compatible with, at least in part, TPM Main Specification (including Part 1 Design Principles, Part 2 TPM Structures, and Part 3 Commands), Version 1.2, Revision 116, published 1 Mar. 2011, by Trusted Computing Group, Inc.

In this embodiment, CS 15 and/or host 10 may comprise, at least in part, circuitry 118. Circuitry 118 may comprise, at least in part, user authentication manager (UAM) 161, secure storage 163, user proximity sensor (UPS) 103, user status manager (USM) 111, and/or TPM controller 113.

In this embodiment, a portion, subset, or component of an entity may comprise all or less than all of the entity. Also, in this embodiment, an agent, process, program, driver, operating system, and/or application may comprise and/or result at least in part from execution of one or more program instructions. In this embodiment, a first entity may be said to be unauthorized to perform an action in connection with a second entity, if the first entity is not currently granted permission (e.g., by an owner, user, and/or administrator of the second entity) to perform the action. In this embodiment, authorization may be, comprise, and/or involve, at least in part (but is not required to be, comprise, and/or involve), authentication, or vice versa. In this embodiment, memory 21 and/or storage 163 each may comprise one or more of the following types of memories: semiconductor firmware memory, programmable memory, non-volatile memory, mass storage, read only memory, electrically programmable memory, random access memory, flash memory, solid state drive memory, hard/fixed disk drive memory, magnetic disk memory, optical disk memory, phase-change memory, and/or other computer-readable and/or writable memory. In this embodiment, mass storage may be or comprise storage that is capable of non-volatile storage of data, and/or from which such data stored therein may be retrieved. Additionally, in this embodiment, a hard/fixed disk drive may be or comprise, for example, one or more platters and/or disks (and/or other circuitry) to and/or from which data may be electrically and/or or magnetically stored and/or retrieved, at least in part. Furthermore, in this embodiment, a solid state drive may be or comprise, for example, one or more flash and/or phase-change memory devices (and/or other circuitry) to and/or from which data may be stored and/or retrieved, at least in part.

As used herein, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, processor core, core, and controller each may comprise respective circuitry capable of performing, at least in part, one or more arithmetic and/or logical operations, such as, for example, one or more respective central processing units. In this embodiment, an embedded controller may be or comprise a controller that is integrated, at least in part, in other circuitry, such as, for example, as one or more circuitry blocks in one or more integrated circuits (e.g., one or more integrated circuit chips or dice) that may comprise and/or embody other and/or additional circuitry and/or functionality.

In this embodiment, I/F 101 may comprise one or more not shown graphical user interface systems. The one or more graphical user interface systems may comprise, e.g., one or more keyboards, pointing devices, portable security device and/or card reader interfaces, and/or display systems that may permit one or more human users 42 to interact with, to input commands, data, and/or security devices/cards into, and/or to receive information/requests from, and/or to monitor, at least in part, one or more operations of one or more hosts 10 and/or one or more components thereof.

In operation of this embodiment, circuitry 118 may be capable of performing, at least in part, one or more operations (shown symbolically by block 181). These one or more operations 181 may comprise, for example, (1) user authorization determination and/or (2) user presence determination.

In this embodiment, the user authorization determination may be in response, at least in part, to and/or based at least in part upon one or more indications 38 of (e.g., physical) presence of one or more users 42 in (e.g., physical) and/or within proximity (e.g., one or more geographic proximities, proximity regions, and/or proximity areas, collectively or singly referred to by dashed box 40) to and/or of the one or more hosts 10. The user authorization determination may be to determine, at least in part, whether the one or more users 42 are authorized to issue one or more commands (e.g., one or more commands 44) to one or more SRC 46 and/or TPM 74. The user presence determination may determine, at least in part, whether, after the one or more indications 38 have been provided, the physical presence of the one or more users 42 to the one or more hosts 10 has ceased (e.g., one or more users 42 are no longer in and/or within the proximity 40).

In this embodiment, circuitry 118 may be capable of performing, at least in part, the one or more operations 181 in isolation from interference from and/or control by one or more CPU 12, one or more OS 31, one or more users 42, and/or one or more other components of one or more hosts 10 and/or system 100. For example, in this embodiment, circuitry 118 may be, comprise, and/or be comprised, at least in part, in one or more not shown embedded controllers of one or more CS 15. Circuitry 118 and/or these one or more embedded controllers may be capable, at least in part, of performing, at least in part, one or more operations 181 in a manner that (1) may not be subject to (e.g., any) control, tampering, inspection, involvement, management, interference, monitoring, and/or access by and/or of one or more CPU 12, one or more OS 31, one or more users 42, and/or one or more other components of one or more hosts 10 and/or system 100, and/or (2) may be wholly independent of (e.g., any) control, tampering, inspection, involvement, management, interference, monitoring, and/or access by and/or of one or more CPU 12, one or more OS 31, one or more users 42, and/or one or more other components of one or more hosts 10 and/or system 100. In order to facilitate this, circuitry 118 and/or these one or more embedded controllers may be fully hidden and/or isolated from access and/or control by one or more CPU 12, one or more OS 31, one or more users 42, and/or one or more other components of one or more hosts 10 and/or system 100. In this embodiment, accessing an entity may comprise one or more operations that may comprise, at least in part, one or more read operations and/or one or more write operations involving, at least in part, the entity. Thus, one or more host CPU 12, one or more OS 31, one or more users 42, and/or other components of hosts 10 and/or system 100 may be incapable of accessing circuitry 118 and/or these one or more embedded controllers, and also may be incapable of controlling, interfering with, and/or monitoring one or more operations 181, circuitry 118 and/or these one or more embedded controllers. Advantageously, this may permit circuitry 118 and/or the one or more embedded controllers to be able to perform, at least in part, one or more operations 181 in a secure and trusted manner/environment that is independent and isolated from interference, control, tampering, and/or modification by one or more host CPU 12, host OS 31, one or more users 42, and/or one or more other components of one or more hosts 10 and/or system 100 (e.g., one or more not shown malicious and/or unauthorized processes/user that may be executed in and/or by (and/or have access to) one or more CPU 12, OS 31, hosts 10, and/or system 100).

For example, in this embodiment, the one or more indications 38 may be based, at least in part, upon (1) activation of one or more secure attention keys (SAK) 50 of the one or more hosts 10 by one or more users 42, (2) provision of one or more GPIO (and/or related) signals 52 to the circuitry 52, detection of one or more physical tokens 56 associated, at least in part, with the one or more users 42, and/or (4) detection of one or more physical characteristics 58 of the one or more users 42. Also, in this embodiment, the user authorization determination may be based, at least in part, upon (1) biometric information/data (e.g., 62 and/or 60) associated, at least in part, with the one or more users 42, (2) one or more challenge responses (e.g., 66 and/or 61) provided, at least in part, by the one or more users 42, and/or (3) data 68, 68' provided, at least in part, by one or more near field communication devices 70 associated, at least in part, with one or more users 42. In this embodiment, a near field communication device may be a device that may be capable, at least in part, of being communicatively coupled, at least in part, via a wireless network, to another device.

Additionally or alternatively, in this embodiment, circuitry 118 may store, at least in part, in storage 163, user authentication information (UAI) 80 and/or user privilege information (UPI) 82. For at least the reasons presented previously, information 80 and/or 82 may be stored, at least in part, in secure storage 163 in a manner that is inaccessible to one or more host OS 31 and/or one or more CPU 12. The user authentication determination may be based, at least in part, upon whether UAI 80 matches, at least in part, other user-associated authentication information 84 provided, at least in part, in response, at least in part, by and/or in association with, at least in part, one or more users 42. For example, at least a portion (e.g., comprising one or more challenge response 66) of such information 84 may be provided, at least in part, in response, at least in part, to at least one challenge 64 presented to the one or more users 42 via one or more hosts I/F 101.

Additionally or alternatively, in this embodiment, after circuitry 118 authenticates the one or more users 42, for example, by determining, at least in part, that one or more users 42 are, in fact, authorized to use, at least in part, the one or more hosts 10, circuitry 118 may determine, at least in part, one or more privileges associated with one or more users 42. For example, these one or more privileges may include whether the one or more users 42 are authorized to issue one or more commands 44 to one or more SRC 46 and/or TPM 74. Circuitry 118 may base, at least in part, this determination of the one or more privileges that may be associated with one or more users 42, upon UPI 82.

Additionally or alternatively, in this embodiment, after circuitry 118 determines, at least in part, that one or more users 42 are authorized to issue one or more commands 44 to one or more commands 44 to one or more SRC 46 and/or TPM 74, circuitry 118 may issue, at least in part, one or more GPIO signals 53 (e.g., to one or more SRC 46 and/or TPM 74). This may result, at least in part, in assertion of one or more physical user presence signals 88 of and/or associated with one or more SRC 46 and/or TPM 74.

Additionally or alternatively, in this embodiment, after circuitry 118 determines, at least in part, that the physical presence of the one or more users 42 in proximity 40 has ceased, circuitry 118 may issue, at least in part, one or more GPIO signals 90 (e.g., to one or more SRC 46 and/or TPM 74) that may result, at least in part, in one or more de-asserted physical user presence signals 92. For example, these de-asserted signals 92 may be or comprise, at least in part, de-assertion of one or more signals 53. Similarly, for example, one or more GPIO signals 90 may be or comprise, at least in part, de-assertion of one or more signals 53.

For example, in operation of this embodiment, one or more users 42 may activate (e.g., press) one or more SAK 50. In this embodiment, one or more SAK 50 may be or comprise, at least in part, a power/reset button of one or more hosts 10. Accordingly, in this embodiment, the activation of one or more SAK 50 by one or more users 42 may initiate, at least in part, a power cycle, reset, and/or reboot of one or more hosts 10. Additionally or alternatively, in this embodiment, contemporaneously at least in part with initiation of the power cycling, resetting, and/or rebooting of one or more hosts 10, the activation of one or more SAK 50 by one or more users 42 may result, at least in part, in transmission of one or more GPIO signals 52 to UAM 161 of circuitry 118. This may result, at least in part, in UAM 161 determining, based at least in part, upon authentication policy information 167 stored, at least in part, in secure storage 163, whether one or more user authentication policies have been established, at least in part, in connection with activation of one or more SAK 50. For example, if no such user authentication policies have been established (e.g., the information 167 does not indicate that any such policies have been established), UAM 161 may determine that no such policies have been established. This may result, at least in part, in UAM 161 determining, at least in part, that one or more users 42 are authorized to issue one or more commands 44 to one or more SRC 46 and/or TPM 74. This may result, at least in part, in TPM controller 113 transmitting, at least in part, one or more asserted GPIO signals 53 to (e.g., one or more not shown user physical presence pins of) one or more SRC 46 and/or TPM 74. This may result, at least in part, in one or more asserted user physical presence signals 88 being supplied, at least in part, to one or more SRC 46 and/or TPM 74. This may result, at least in part, in one or more users 42 becoming authorized (e.g., by one or more SRC 46 and/or TPM 74) to issue one or more commands 44 to one or more SRC 46 and/or TPM 74. Thereafter, one or more users 42 may issue one or more commands 44 to one or more SRC 46 and/or TPM 74, via I/F 101 and/or circuitry 118.

In this embodiment, one or more commands 44 may be or comprise, for example, one or more privileged and/or restricted SRC/TPM administrative and/or other commands. For example, these one or more administrative and/or other commands may permit setting and/or modification, at least in part, of user, user process/application, and/or other privileges associated with use and/or control of one or more hosts 10, one or more CPU 12, and/or one or more OS 31. In this embodiment, a privilege may comprise one or more authorizations to perform an action.

Conversely, if one or more user authentication policies have been established, information 167 may so indicate. In this case, UAM 161 may determine, based at least in part, upon information 167, one or more authentication procedures/operations that are to be carried out in accordance with (e.g., as specified by), at least in part, such information 167. For example, these one or more authentication procedures/operations may comprise, at least in part, UAM 161 requesting and/or prompting the one or more users 42 to provide authentication information 84, one or more other credentials (e.g., one or more tokens 56), and/or satisfy other authentication criteria (e.g., one or more identifying user physical characteristics 58).

For example, UAM 161 may provide one or more challenges 64 to one or more users 42 via one or more I/F 101. These one or more challenges 64 may be or comprise, for example, one or more requests/prompts that the one or more users 42 provide, in response at least in part to one or more challenges 64, authentication information 84, one or more other credentials (e.g., one or more tokens 56), and/or satisfy other authentication criteria (e.g., one or more identifying user physical characteristics 58). In response, at least in part, to one or more challenges 64, one or more users 42 may provide, at least in part via one or more I/F 101, authentication information 84, one or more other credentials (e.g., one or more tokens 56), and/or satisfy other authentication criteria (e.g., one or more identifying user physical characteristics 58).

For example, in response, at least in part, to one or more challenges 64, one or more users 42 may (1) input via one or more I/F 101 one or more challenge responses 66 (e.g., comprising one or more user names, passwords, secret credentials, etc.) associated at least in part with the one or more users 42, (2) insert into and/or otherwise permit to be read, at least in part, by one or more I/F 101, information/data 85 stored in one or more tokens 56, (3) permit one or more I/F 101 to scan, read, image, and/or otherwise obtain biometric information 62 and/or one or more physical characteristics 58 of the one or more users 42. Additionally or alternatively, one or more UPS 103 may wirelessly detect presence of one or more devices 70 (e.g., that may be carried on or about the one or more users 42) and/or user authentication/identification data 68 securely transmitted from one or more device 70. The provision of data 68 (and/or at least certain of the above types of user authentication/identification information 84, etc.) may be carried out, at least in part, in a secure fashion, for example, using one or more cryptographic algorithms involving use of secure cryptographic keys, etc. that may reduce the likelihood of successful eavesdropping, man-in-the-middle attacks, tampering, etc. by unauthorized entities.

In this embodiment, biometric data and/or information may be or comprise, at least in part, data that may represent, correspond to, and/or be derived from, at least in part, one or more biological, biochemical, genetic, and/or physical characteristics of one or more humans. In this embodiment, a physical characteristic of a human user may be or comprise, at least in part, one or more attributes related to one or more phenomena of the user. Examples of such phenomena may include, without limitation, one or more images, characteristics, patterns, and/or features of one or more retina, speech exemplars, fingerprints, facial appearances, etc. of the user.

UAM 161 may compare, at least in part, the provided information 84, data 68, one or more challenge responses 66, biometric information 62, and/or data 85 with information 80, data 68', one or more challenge responses 61, biometric information 60, and/or information/data 85', respectively, previously stored, at least in part, in secure storage 163, for possible match therewith. If information 84, data 68, one or more challenge responses 66, biometric information 62, and/or data 85 matches, at least in part, information 80, data 68', one or more challenge responses 61, biometric information 60, and/or information/data 85', respectively, UAM 161 may determine that one or more users 42 are authorized to use, at least in part, one or more hosts 10. In this case, UAM 161 also may identify, at least in part, one or more users 42 based upon information 80, data 68', one or more challenge responses 61, biometric information 60, and/or information/data 85'. Based at least in part upon this identification, at least in part, of one or more users 42, UAM 161 may determine, at least in part, based at least in part upon user privilege information 82, which user privileges (if any) may be granted to one or more users 42 (e.g., in connection with one or more SRC 46, one or more TPM 74, and/or issuance of one or more commands 44). If one or more users 42 have been granted appropriate user privileges (e.g., as reflected at least in part in user privilege information 82) that permit one or more users 42 to issue one or more commands 44 to one or more SRC 46 and/or TPM 74, UAM 161 may so determine. This may result, at least in part, in TPM controller 113 transmitting, at least in part, one or more asserted GPIO signals 53 to (e.g., the one or more not shown user physical presence pins of) one or more SRC 46 and/or TPM 74. This may result, at least in part, in one or more asserted user physical presence signals 88 being supplied, at least in part, to one or more SRC 46 and/or TPM 74. This may result, at least in part, in one or more users 42 becoming authorized (e.g., by one or more SRC 46 and/or TPM 74) to issue one or more commands 44 to one or more SRC 46 and/or TPM 74. Thereafter, one or more users 42 may issue one or more commands 44 to one or more SRC 46 and/or TPM 74, via I/F 101 and/or circuitry 118.

In this embodiment, the activation of SAK 50 by one or more users 42, provision of one or more GPIO signals 52 to UAM 161, detection and/or reading of one or more tokens 56 by I/F 101, detection and/or obtaining of one or more characteristics 58, and/or provision of data 68 to UPS 103 may indicate, at least in part, the physical presence of one or more user 42 in the proximity 40 of the one or more hosts 10. Thus, in this embodiment, one or more indications 38 may be based upon, be, comprise, arise out of, and/or embody, at least in part, the activation of SAK 50 by one or more users 42, provision of one or more GPIO signals 52 to UAM 161, detection and/or reading of one or more tokens 56 by I/F 101, detection and/or obtaining of one or more characteristics 58, and/or provision of data 68 to UPS 103.

After one or more indications 38 have been provided, and/or UAM 161 has authenticated and/or identified one or more users 42, USM 111 may determine, at least in part, that the one or more users 42 are currently in active authenticated session involving and/or granted access to one or more hosts 10, SRC 46, and/or TPM 74. Thereafter, UPS 103, UAM 161, and/or I/F 101 may monitor (e.g., periodically, continuously, or intermittently) to determine whether and/or when the physical presence of the one or more users 42 in the proximity 40 has ceased (e.g., as a result of the one or more users 42 leaving the proximity 40). Such monitoring may be in response, at least in part, to one or more requests from USM 111.

For example, UPS 103 may be capable of detecting (e.g., based at least in part upon one or more characteristics of the signal received from one or more devices 70) whether the one or more devices 70 (and therefore, also one or more users 42) may no longer be within the proximity 40. Based at least in part upon this, UPS 103 may periodically, continuously, or intermittently monitor to determine whether one or more devices 70 and/or one or more users 42 have ceased to be in the proximity 40.

Alternatively or additionally, in this embodiment, UAM 161 and/or I/F 101 may periodically and/or intermittently issue one or more additional challenges to the one or more users 42. If the one or more users 42 fail to provide one or more appropriate challenge responses and/or responsive biometric data within a certain (e.g., predetermined) time period, UAM 161 and/or I/F 101 may determine that one or more users 42 have ceased to be physically present in the proximity 40.

Alternatively or additionally, in this embodiment, I/F 101 may continuously, periodically, or intermittently monitor to determine whether the one or more physical characteristics 58 are no longer detectable within the proximity 40. If such occurs, I/F 101 and/or UAM 161 may determine that one or more users 42 have ceased to be physically present in proximity 40. Many other alternatives are possible without departing from this embodiment.

After UPS 103, UAM 161, and/or I/F 101 determine that the physical presence of the one or more users 42 in the proximity 40 has ceased, this condition may be indicated, at least in part, by UPS 103, UAM 161, and/or I/F 101 to USM 111. In response, at least in part, to such indication, USM 111 may terminate, at least in part, the active authenticated session involving, and/or access of the one or more users 42 to one or more hosts 10, SRC 46, and/or TPM 74. For example, USM 111 may signal this change of status to UAM 161 and/or TPM controller 113. This may result, at least in part, in one or more users 42 no longer being considered as authenticated by UAM 161. This may also result, at least in part, in TPM controller 113 issuing, at least in part, one or more de-asserted GPIO signals 90 to one or more SRC 46 and/or TPM 74. This may result, at least in part, in one or more de-asserted physical user presence signals 92 of SRC 46 and/or TPM 74. As a result, at least in part, of this, the one or more users 42 may no longer be authorized to (and therefore, capable of) issuing, at least in part, one or more commands 44 to one or more SRC 46 and/or TPM 74 in a manner that may result in execution of the one or more commands 44 by one or more SRC 46 and/or TPM 74.

Many alternatives are possible without departing from this embodiment. For example, at least a subset of the components and/or functions of circuitry 118 may be emulated, at least in part, by one or more software agents 204 that may be resident, at least in part, in memory 21. For example, circuitry 118 may execute, at least in part, one or more agents 204 that may perform, at least in part, the user authorization determination and/or user presence determination of one or more operations 181. In this embodiment, one or more agents 204 may be capable of performing, at least in part, either or both of these determinations (and/or one or more other operations, including one or more other operations that may be comprised in one or more operations 181) in isolation both from interference from and control by the one or more CPU 12 and/or OS 31.

Additionally or alternatively, in this embodiment, one or more CPU 12 may execute, at least in part, one or more agents 204 in a manner that is in isolation both from interference from and control by the one or more OS 31. For example, one or more CPU 12 may comprise one or more secure hardware partitions that may be secured from such interference and/or control by OS 31. These one or more secure partitions may be used, at least in part, to execute one or more agents 204.

Additionally or alternatively, without departing from this embodiment, one or more agents 204 may be capable, at least in part, of establishing, at least in part, one or more (and in this embodiment, a plurality of) secure communication channels 206A . . . 206N (see FIG. 2) with (e.g., between one or more agents 204 and) one or more SRC 46. These secure communication channels 206A . . . 206N may be implemented, at least in part, via software, and/or may be inaccessible, at least in part, by and/or to one or more CPU 12 and/or OS 31.

Figure 2:
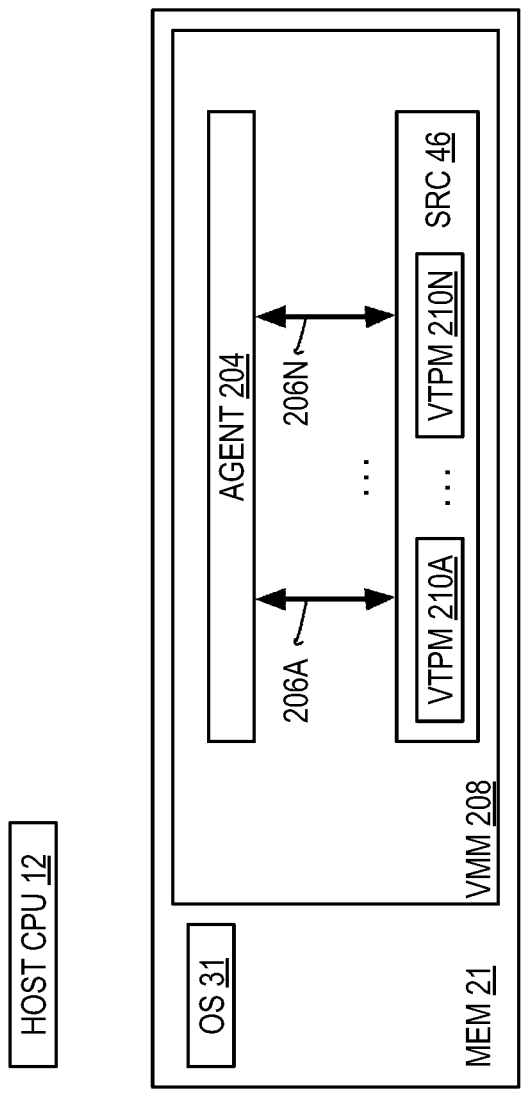
FIG. 2 illustrates elements in an embodiment.

Also additionally or alternatively, without departing from this embodiment, as shown in FIG. 2, one or more agents 204 may be comprised, at least in part, in one or more virtual machine manager (VMM) processes 208. In this arrangement, the one or more SRC 46 may be software emulated, at least in part, by and/or comprised in, at least in part, one or more VMM processes 208. The one or more SRC 46 may be or comprise, at least in part, one or more (and in this embodiment, a plurality of) virtual TPM 210A . . . 210N that may be emulated and/or implemented, at least in part, by the one or more VMM processes 208. The virtual TPM 210A . . . 210N may be communicatively coupled to the one or more agents 204 via (e.g., one or more respective) secure channels 206A . . . 206N. In this arrangement, the use of GPIO signals may be dispensed with, at least in part, and in their place, one or more of the channels 206A . . . 206N may be used to indicate, at least in part, the physical presence of the one or more users 42 in the proximity 40, and/or the ceasing of such presence.

Figure 3:
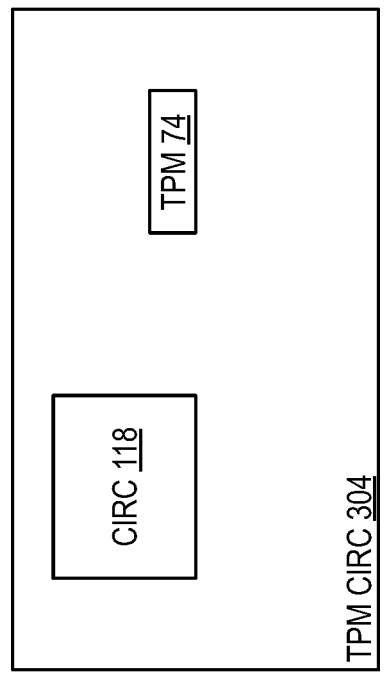
FIG. 3 illustrates elements in an embodiment.

Additionally or alternatively, as shown in FIG. 3, circuitry 118 may be comprised, at least in part, in one or more TPM (e.g., in TPM circuitry 304 that may comprise one or more TPM 74). Further additionally or alternatively, as shown in FIG. 4, circuitry 118, may be comprised, at least in part, in one or more hardware security modules (e.g., in hardware security module circuitry 404 that may comprise one or more hardware security modules 401).

Additionally or alternatively, as shown in FIG. 5, circuitry 118 may be comprised, at least in part, in one or more devices 504 that may be capable of being removably communicatively coupled to the one or more hosts 10. For example, one or more hosts 10 and/or one or more devices 504 may comprise one or more interfaces 501 and 503, respectively. Interfaces 501 and 503 may comply and/or be compatible with, at least in part, Universal Serial Bus 3.0 Specification, Revision 1.0, published Nov. 12, 2008, Hewlett-Packard Company et al. (hereinafter referred to as "USB protocol"). Of course, other types of interfaces and/or protocols may be employed without departing from this embodiment. For example, one or more devices 504 may be or comprise one or more physical tokens or other type of device. In this embodiment, when interfaces 503 and 501 are communicatively coupled together, circuitry 118 and one or more hosts 10 may be communicatively coupled together in a manner that may permit circuitry 118 to operate, at least in part, in the manner described previously herein.

In this embodiment, the components and/or circuitry that may be comprised, at least in part, in circuitry 118 may be, be comprised in, or comprise, at least in part, one or more trusted execution environments (TEE). Without departing from this embodiment, these components, circuitry 118, and/or one or more TEE may be implemented, at least in part, by microcode executed by and/or in one or more CPU 12 that may, for example, partition memory and/or CPU resources and/or perform operations analogous to those performed by circuitry 118, its components, and/or the one or more TEE. Alternatively or additionally, without departing from this embodiment, virtualization microcode and/or VMM/hypervisor software may be used to implement, at least in part, some or all of the components/operations of circuitry 118 and/or one or more such TEE.

For example, without departing from this embodiment, these components, circuitry 118, and/or one or more TEE may be or comprise, at least in part, logic that may comprise, at least in part, physical hardware/circuitry. In this arrangement, such logic may be capable of performing, at least in part, the at least one operation in isolation both from interference from and control by the at least one host CPU and the at least one host OS. As described above, the at least one operation may comprise (1) user authorization determination and/or (2) user presence determination. The user authorization determination may be in response, at least in part, to indication of physical presence of at least one user in proximity to the host. The user authorization determination may be to determine, at least in part, whether the at least one user is authorized to issue at least one command to at least one SRC of the host. The user presence determination may be to determine, at least in part, whether, after the indication has been provided, the physical presence of the at least one user in the proximity to the host has ceased.

Additionally or alternatively, without departing from this embodiment, these components, CPU 12, circuitry 118, TPM, and/or one or more TEE may be or be comprised in, at least in part, at least one system-on-chip and/or one or more chip/processor packages that may be comprised in such system-on-chip. Such system-on-chip may be comprised, for example, in one or more not shown smartphones, tablet computers, and/or other devices.

In this embodiment, circuitry 118 and/or one or more components thereof may be comprised, at least in part, in an Intel® Active Management Technology™ Manageability Engine and/or other components. Additionally or alternatively, one or more operations 181 may occur, at least in part, in a pre-OS-boot state of one or more hosts 10. Of course, many other configurations are possible without departing from this embodiment.

In this embodiment, activation of an entity may be or comprise, at least in part, initiation of and/or placing, at least in part, of the entity (and/or one or more components thereof) into a relatively higher power state relative to a present relatively lower power state. Also in this embodiment, a GPIO signal may be or comprise one or more signals whose purpose, function, and/or result may differ depending at least in part upon one or more states and/or configurations of one or more entities to which the one or more signals may be supplied. Additionally, in this embodiment, a signal may be said to be asserted if at least one characteristic of the signal is associated with a logic state that is different from another logic state that is associated with de-assertion. Additionally in this embodiment, a VMM process may be or comprise, at least in part, at least one process involved, at least in part, in managing, controlling, and/or modifying one or more features, functions, and/or operations of one or more virtual machines. In this embodiment, a virtual machine may be or comprise, at least in part, a host that is capable, at least in part, of executing two or more operating systems contemporaneously, at least in part.

Thus, in a first example in this embodiment, an apparatus that may be used in association with a host is provided. The apparatus may comprise circuitry that is to be comprised, at least in part, in the host. The host may include at least one host CPU to execute, at least in part, at least one host OS. The circuitry may be capable of performing, at least in part, at least one operation in isolation both from interference from and control by the at least one host CPU and the at least one host OS. The at least one operation may comprise (1) user authorization determination and/or (2) user presence determination. The user authorization determination may be in response, at least in part, to indication of physical presence of at least one user in proximity to the host. The user authorization determination may be to determine, at least in part, whether the at least one user is authorized to issue at least one command to at least one SRC of the host. The user presence determination may be to determine, at least in part, whether, after the indication has been provided, the physical presence of the at least one user in the proximity to the host has ceased.

In a second example of this embodiment that may comprise some or all of the elements of the first example, the indication of the physical presence may be based, at least in part, upon one or more of: (1) activation of at least one secure attention key of the host by the at least one user, (2) provision of at least one GPIO signal to the circuitry, (3) detection of at least one physical token associated with the at least one user, and/or (4) detection of at least one physical characteristic of the at least one user. In a third example of this embodiment that may comprise the elements of the first and/or second examples, the user authorization determination is based, at least in part, upon one or more of: (1) biometric information associated with the at least one user, (2) at least one challenge response provided by the at least one user, and/or (3) data provided by at least one near field communication device associated with the at least one user.

In a fourth example of this embodiment that may comprise some or all of the elements of any of the preceding examples, the at least one SRC may comprise a TPM. The circuitry of this fourth example may be to store, at least in part, user authentication information and/or user privilege information in a manner that may be inaccessible to at least one host OS and/or at least one host CPU. Also in this fourth example, the user authentication determination may be based at least in part upon whether the user authentication information matches, at least in part, other user-associated information provided in response, at least in part, to at least one challenge by the circuitry. In this fourth example, after the circuitry determines, at least in part, that the at least one user is authorized to use, at least in part, the host, the circuitry may be to determine, based at least in part, upon the user privilege information, whether the at least one user may be authorized to issue the at least one command to the TPM.

In a fifth example that may comprise some or all of the elements of the fourth example, after the circuitry determines, at least in part, that the at least one user may be authorized to issue the at least one command to the TPM, the circuitry may be to issue, at least in part, a GPIO signal that results, at least in part, in assertion of a physical user presence signal of the TPM. In a sixth example that may comprise the elements of the fourth example, after the circuitry determines, at least in part, that the physical presence of the at least one user in the proximity to the host has ceased, the circuitry is to issue, at least in part, a GPIO signal that results, at least in part, in de-assertion of the physical user signal of the TPM.

In a seventh example of this embodiment that may comprise some or all of the elements of any of the preceding examples, the circuitry may satisfy one or more of the following conditions (a) to (g). In condition (a), the circuitry may be to execute, at least in part, at least one software agent to perform, at least in part, the user authorization determination and/or the user presence determination. Also in the condition (a), the at least one software agent may be to establish, at least in part, at least one secure communication channel with the at least one SRC.

In condition (b), the circuitry may be comprised, at least in part, in a TPM. In condition (c), the circuitry may be comprised, at least in part, in a hardware security module. In condition (d), the at least one software agent may be comprised, at least in part, in a virtual machine manager. In condition (e), the at least one SRC comprises, at least in part, at least one virtual TPM implemented, at least in part, by the virtual machine manager. In condition (f), the at least one virtual TPM may comprise a plurality of virtual TPM. In condition (g), the circuitry may be comprised, at least in part, in at least one device that may be capable of being removably communicatively coupled to the host.

In an eighth example of this embodiment, computer-readable memory is provided that stores one or more instructions that when executed by a machine results in the performance of operations that may comprise (1) the at least one operation that the circuitry of the apparatus may be capable of performing, and/or (2) any combination of any of the operations performed by the circuitry and/or apparatus in any of the preceding examples. In a ninth example of this embodiment, a method is provided for use in association with the host. The method of this ninth example may comprise (1) the at least one operation that the circuitry of the apparatus in the first example of this embodiment may be capable of performing, (2) any combination of any of the operations performed by the circuitry and/or apparatus in any of the preceding examples, and/or (3) any combination of any of the operations that may be performed by execution of the one or more instructions stored in the computer-readable memory of the eighth example of this embodiment.

In a tenth example of this embodiment, means may be provided to carry out any of, and/or any combination of, the operations that may be performed by the method, apparatus, computer-readable memory, and/or circuitry in any of the preceding examples.

Advantageously, in this embodiment, a separate authentication (e.g., independent of a user merely pressing SAK 50) of the user may be carried out prior to and/or as a condition for the user being granted access to the security/administrative functions of the SRC/TPM. Advantageously, this may significantly reduce the possibility, in this embodiment, that an unauthorized user who obtains physical access to the host and presses the SAK 50 may be able to gain access to the security/administrative functions of the SRC/TPM.

Further advantageously, in this embodiment, continuing access to the security/administrative functions of the SRC/TPM may be conditioned upon an authorized user remaining in proximity to the host, and such access may be revoked if the user ceases to be in proximity to the host. Advantageously, in this embodiment, this may prevent an unauthorized person from being able to gain access to such functions, for example, after the authorized user has left the proximity of the host.

Many alternatives, modifications, and/or variations are possible without departing from this embodiment. For example, in an eleventh example of this embodiment, machine-readable memory may be provided that may store instructions and/or design data, such as Hardware Description Language, that may define one or more subsets of the structures, circuitry, apparatuses, features, etc. described herein (e.g., in any of the preceding examples of this embodiment). Accordingly, the claims are intended to embrace all such alternatives, modifications, and/or variations.

What is claimed is:

1. An apparatus to be used in association with a host, the apparatus comprising:
   circuitry to be comprised, at least in part, in the host, the host including at least one host central processing unit (CPU) and one or more chipsets, the one or more chipsets comprising one or more embedded controllers, the one or more CPU to execute, at least in part, at least one host operating system (OS), the circuitry being comprised, at least in part, in at least one of:
      the one or more embedded controllers; and
      one or more hardware partitions comprised in the one or more CPU;
   the at least one of the one or more embedded controllers and the one or more hardware partitions being capable of performing, at least in part, at least one operation in isolation from interference from, access by, and control by the at least one host OS, the at least one operation comprising:
      user authorization determination in response, at least in part, to indication of physical presence of at least one user within one or more geographic regions comprising the host, the user authorization determination to determine, at least in part, whether the at least one user is authorized to issue at least one command to at least one security-related component of the host, wherein the indication is based at least in part upon at least one of:
         activation of at least one secure attention key of the host by the at least one user;
         provision of at least one general purpose input/output (GPIO) signal to the circuitry;
         detection of at least one physical token associated with the at least one user; and
         detection of at least one physical characteristic of the at least one user; and
      user presence determination to determine, at least in part, whether, after the indication has been provided, the physical presence of the at least one user in the one or more regions has ceased;
   wherein the circuitry is to satisfy at least one of the following subparagraphs (a) to (e):
      (a) the circuitry is to execute, at least in part, at least one software agent to perform, at least in part, at least one of the user authorization determination and the user presence determination, and the at least one agent also is to establish, at least in part, at least one secure communication channel with the at least one security-related component;
      (b) the at least one software agent is to be comprised, at least in part, in a virtual machine manager;
      (c) the at least one security-related component comprises at least one virtual trusted platform module (TPM) that is to be implemented, at least in part, by the virtual machine manager;
      (d) the at least one virtual TPM comprises a plurality of virtual TPM; and (e) the circuitry is comprised, at least in part, in at least one device that is capable of being removably communicatively coupled to the host.

2. The apparatus of claim 1, wherein:
the user authorization determination is based, at least in part, upon at least one of:
  biometric information associated with the at least one user;
  at least one challenge response provided by the at least one user; and
  data provided by at least one near field communication device associated with the at least one user.

3. The apparatus of claim 1, wherein:
the at least one security-related component comprises another TPM;
the circuitry is to store, at least in part, user authentication information and user privilege information in a manner that is inaccessible to the at least one host OS and at least one host CPU;
the user authentication determination is based at least in part upon whether the user authentication information matches, at least in part, other user-associated information provided in response, at least in part, to at least one challenge by the circuitry; and
after the circuitry determines, at least in part, that the at least one user is authorized to use, at least in part, the host, the circuitry is to determine, based at least in part, upon the user privilege information, whether the at least one user is authorized to issue the at least one command to the another TPM.

4. The apparatus of claim 3, wherein:
after the circuitry determines, at least in part, that the at least one user is authorized to issue the at least one command to the another TPM, the circuitry is to issue, at least in part, a general purpose input/output signal that results, at least in part, in assertion of a physical user presence signal of the another TPM.

5. The apparatus of claim 3, wherein:
after the circuitry determines, at least in part, that the physical presence of the at least one user in the one or more regions has ceased, the circuitry is to issue, at least in part, a general purpose input/output signal that results, at least in part, in de-assertion of a physical user presence signal of the another TPM.

6. Non-transitory computer-readable memory storing one or more instructions that when executed by a machine result in performance of operations comprising:
at least one operation performed, at least in part, by circuitry, the circuitry to be comprised, at least in part, in a host, the host including at least one host central processing unit (CPU) to execute, at least in part, at least one host operating system (OS) and one or more chipsets, the one or more chipsets comprising one or more embedded controllers, the one or more CPU to execute, at least in part, at least one host operating system (OS), the circuitry being comprised, at least in part, in at least one of:
  the one or more embedded controllers; and
  one or more hardware partitions comprised in the one or more CPU;
the at least one of the one or more embedded controllers and the one or more hardware partitions to perform, at least in part, the at least one operation in isolation from interference from, access by, and control by the at least one host OS, the at least one operation comprising:
  user authorization determination in response, at least in part to indication of physical presence of at least one user within one or more geographic regions comprising the host, the user authorization determination to determine, at least in part, whether the at least one user is authorized to issue at least one command to at least one security-related component of the host, wherein the indication is based at least in part upon at least one of:
    activation of at least one secure attention key of the host by the at least one user;
    provision of at least one general purpose input/output (GPIO) signal to the circuitry;
    detection of at least one physical token associated with the at least one user; and
    detection of at least one physical characteristic of the at least one user; and
  user presence determination to determine, at least in part, whether, after the indication has been provided, the physical presence of the at least one user in the one or more regions has ceased;
wherein the circuitry is to satisfy at least one of the following subparagraphs (a) to (e):
  (a) the circuitry is to execute, at least in part, at least one software agent to perform, at least in part, at least one of the user authorization determination and the user presence determination, and the at least one agent also is to establish, at least in part, at least one secure communication channel with the at least one security-related component;
  (b) the at least one software agent is to be comprised, at least in part, in a virtual machine manager;
  (c) the at least one security-related component comprises at least one TPM that is to be implemented, at least in part, by the virtual machine manager;
  (d) the at least one virtual TPM comprises a plurality of virtual TPM; and
  (e) the circuitry is comprised, at least in part, in at least one device that is capable of being removably communicatively coupled to the host.

7. The computer-readable memory of claim 6, wherein:
the user authorization determination is based, at least in part, upon at least one of:
  biometric information associated with the at least one user;
  at least one challenge response provided by the at least one user; and
  data provided by at least one near field communication device associated with the at least one user.

8. The computer-readable memory of claim 6, wherein:
the at least one security-related component comprises another TPM;
the circuitry is to store, at least in part, user authentication information and user privilege information in a manner that is inaccessible to the at least one host OS and at least one host CPU;
the user authentication determination is based at least in part upon whether the user authentication information matches, at least in part, other user-associated information provided in response, at least in part, to at least one challenge by the circuitry; and
after the circuitry determines, at least in part, that the at least one user is authorized to use, at least in part, the host, the circuitry is to determine, based at least in part, upon the user privilege information, whether the at least one user is authorized to issue the at least one command to the another TPM.

9. The computer-readable memory of claim 8, wherein:
after the circuitry determines, at least in part, that the at least one user is authorized to issue the at least one command to the another TPM, the circuitry is to issue, at least in part, a general purpose input/output signal that results, at least in part, in assertion of a physical user presence signal of the another TPM.

10. The computer-readable memory of claim 8, wherein:
after the circuitry determines, at least in part, that the physical presence of the at least one user in the one or more regions has ceased, the circuitry is to issue, at least in part, a general purpose input/output signal that results, at least in part, in de-assertion of a physical user presence signal of the another TPM.

11. A method for use in association with a host, the method comprising:
at least one operation performed, at least in part, by circuitry, the circuitry to be comprised, at least in part, in the host, the host including at least one host central processing unit (CPU) and one or more chipsets, the one more chipsets comprising one or more embedded controllers, the one more CPU to execute, at least in part, at least one host operating system (OS), the circuitry being comprised, at least in part, in at least one of:
the one or more embedded controllers; and
one or more hardware partitions comprised in the one or more CPU;
the at least one of the one or more embedded controllers and the one or more hardware partitions to perform, at least in part, the at least one operation in isolation from interference from, access by, and control by the at least one host OS, the at least one operation comprising:
user authorization determination in response, at least in part, to indication of physical presence of at least one user within one or more geographic regions comprising the host, the user authorization determination to determine, at least in part, whether the at least one user is authorized to issue at least one command to at least one security-related component of the host; and
user presence determination to determine, at least in part, whether, after the indication has been provided, the physical presence of the at least one user in the one or more regions has ceased, wherein the indication is based at least in part upon at least one of:
activation of at least one secure attention key of the host by the at least one user;
provision of at least one general purpose input/output (GPIO) signal to the circuitry;
detection of at least one physical token associated with the at least one user; and
detection of at least one physical characteristic of the at least one user;
wherein the circuitry is to satisfy at least one of the following subparagraphs (a) to (e):
(a) the circuitry is to execute, at least in part, at least one software agent to perform, at least in part, at least one of the user authorization determination and the user presence determination, and the at least one agent also is to establish, at least in part, at least one secure communication channel with the at least one security-related component;
(b) the at least one software agent is to be comprised, at least in part, in a virtual machine manager;
(c) the at least one security-related component comprises at least one TPM that is to be implemented, at least in part, by the virtual machine manager;
(d) the at least one virtual TPM comprises a plurality of virtual TPM; and
(e) the circuitry is comprised, at least in part, in at least one device that is capable of being removably communicatively coupled to the host.

12. The method of claim 11, wherein:
the user authorization determination is based, at least in part, upon at least one of:
biometric information associated with the at least one user;
at least one challenge response provided by the at least one user; and
data provided by at least one near field communication device associated with the at least one user.

13. The method of claim 11, wherein:
the at least one security-related component comprises another TPM;
the circuitry is to store, at least in part, user authentication information and user privilege information in a manner that is inaccessible to the at least one host OS and at least one host CPU;
the user authentication determination is based at least in part upon whether the user authentication information matches, at least in part, other user-associated information provided in response, at least in part, to at least one challenge by the circuitry; and
after the circuitry determines, at least in part, that the at least one user is authorized to use, at least in part, the host, the circuitry is to determine, based at least in part, upon the user privilege information, whether the at least one user is authorized to issue the at least one command to the another TPM.

14. The method of claim 13, wherein:
after the circuitry determines, at least in part, that the at least one user is authorized to issue the at least one command to the another TPM, the circuitry is to issue, at least in part, a general purpose input/output signal that results, at least in part, in assertion of a physical user presence signal of the another TPM.

15. The method of claim 13, wherein:
after the circuitry determines, at least in part, that the physical presence of the at least one user in the one or more regions has ceased, the circuitry is to issue, at least in part, a general purpose input/output signal that results, at least in part, in de-assertion of a physical user presence signal of the another TPM.

16. An apparatus, comprising:
logic, at least partially comprising hardware, to be comprised, at least in part, in a host, the host including at least one host central processing unit (CPU) and one or more chipsets, the one or more chipsets comprising one or more embedded controllers, the one or more CPU to execute, at least in part, at least one host operating system (OS), the logic being comprised, at least in part, in at least one of:
the one or more embedded controllers; and
one or more hardware partitions comprised in the one or more CPU;
the at least one of the one or more embedded controllers and the one or more hardware partitions being capable of performing, at least in part, at least one operation in isolation from interference from, access by, and control by the at least one host OS, the at least one operation comprising:
user authorization determination in response, at least in part, to indication of physical presence of at least one user within one or more geographic regions comprising the host, the user authorization determination to determine, at least in part, whether the at least one user is authorized to issue at least one command to at least one security-related component of the host, wherein the indication is based at least in part upon at least one of:

activation of at least one secure attention key of the host by the at least one user;

provision of at least one general purpose input/output (GPIO) signal to the circuitry;

detection of at least one physical token associated with the at least one user; and detection of at least one physical characteristic of the at least one user; and user presence determination to determine, at least in part, whether, after the indication has been provided, the physical presence of the at least one user in the one or more regions has ceased;

wherein the circuitry is to satisfy at least one of the following subparagraphs (a) to (e):

(a) the circuitry is to execute, at least in part, at least one software agent to perform, at least in part, at least one of the user authorization determination and the user presence determination, and the at least one agent also is to establish, at least in part, at least one secure communication channel with the at least one security-related component;

(b) the at least one software agent is to be comprised, at least in part, in a virtual machine manager;

(c) the at least one security-related component comprises at least one TPM that is to be implemented, at least in part, by the virtual machine manager;

(d) the at least one virtual TPM comprises a plurality of virtual TPM; and (e) the circuitry is comprised, at least in part, in at least one device that is capable of being removably communicatively coupled to the host.

* * * * *